(12) United States Patent
Mehrotra et al.

(10) Patent No.: US 8,054,763 B2
(45) Date of Patent: Nov. 8, 2011

(54) MIGRATION OF SWITCH IN A STORAGE AREA NETWORK

(75) Inventors: Vivek Mehrotra, Karnataka (IN); Satish Kumar Mopur, Karnataka (IN); Saikat Mukherjee, Karnataka (IN); Satyaprakash Rao, Marlborough, MA (US); Gunalan Perumal Vijayan, Karnataka (IN); Sridhar Balachandriah, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 194 days.

(21) Appl. No.: 12/466,395

(22) Filed: May 15, 2009

(65) Prior Publication Data

US 2010/0293316 A1      Nov. 18, 2010

(51) Int. Cl.
*H04L 12/28* (2006.01)
(52) U.S. Cl. .................................................. 370/254
(58) Field of Classification Search ................ None
See application file for complete search history.

(56) References Cited

U.S. PATENT DOCUMENTS

| 2007/0280134 A1* | 12/2007 | Ramanan et al. | 370/254 |
| 2009/0177878 A1* | 7/2009 | Gao et al. | 713/100 |
| 2009/0187606 A1* | 7/2009 | Allweil et al. | 707/201 |

* cited by examiner

*Primary Examiner* — Chirag Shah
*Assistant Examiner* — Amar Persaud

(57) ABSTRACT

A method, system and computer program product for migrating at least one switch in a storage area network is disclosed. The migration is done by analysing the I/O traffic to identify patterns in the I/O traffic of the switch; forecasting future I/O workload of the switch based on one or more identified patterns in the I/O traffic, determining appropriate timing for migration based on the identified patterns and administrator inputs; processing the storage area network configuration data to identify the storage network physical and logical access paths to the or each selected switch to create a first connectivity map; generating a second connectivity map based on the first connectivity map and administrator inputs; and migrating the or each switch migration based on the second connectivity map and the appropriate timing. The migration may comprise routing the I/O traffic from the switch to be migrated to the alternate switches in the storage area network. The migration may further comprising transforming zones on the switch to be migrated and deploying the transformed zones to the new switch.

18 Claims, 6 Drawing Sheets

MIGRATION OF SWITCH IN A STORAGE AREA NETWORK

BACKGROUND

A storage area network (SAN) is an architecture to attach remote storage devices to servers in such a way that the storage devices appear as locally attached to the operating system. Storage area networks may be used for enabling multiple applications on servers access to data stored in consolidated shared storage infrastructures. Enterprises are deploying increasingly large-scale SANs in order to gain economies-of-scale business benefits, and are performing and planning massive business-critical migration processes to these new environments.

Enterprise SANs are increasingly supporting most of the business critical applications in enterprises. These SAN are increasingly large and complex. A typical SAN environment may contain a few hundred servers and tens of switches and storage devices of different types. Furthermore these SAN environments are undergoing a large amount of change and growth. This large size and rate of growth of SANs leads to huge added complexity. The number of components and links which may be associated with the data transfer from each given application and one or more of its data units (LUNs— stored on one or more shared storage devices) may increase exponentially with the size of the SAN.

This complexity, which is compounded by the heterogeneity of the different SAN devices, leads to high risk and inefficiency. Changes to the SAN (which need to happen often due to the natural growth of the SAN) take a long time to complete by groups of SAN managers, and are error-prone. For example, in many existing SAN environments a routine change such as adding a new server or a switch to the SAN may take a day to a week depending on the complexity. Further businesses may not be willing to have a down time even in the order of hours depending on their business continuity requirements.

One of the main reasons for these problems in SANs is a consequence of the fact that applications and data LUNs, the end-points in SAN flows, have a relatively strong exclusive access relationship, involving a fabric (constituting one or more switches) in the flow paths. That is, each application on a SAN-connected host typically requires access (often exclusive access) only to some specific SAN data units (LUNs). Consequently, in storage area networks each source end point (application on a host) will typically need to interact only (and often exclusively) with a specific, small minority of target end points (LUNs on storage devices), ever.

However that access relationship and its related access characteristics actually need to be realized by setting up multiple underlying devices of different types. These underlying operations include multiple physical and logical basic set up actions (sometime tens per a single logical change) which need to be set up in different locations and device types, with perfect mutual consistency.

BRIEF DESCRIPTION OF THE DRAWINGS

Embodiments of the present invention are illustrated by way of example only and not limited to the figures of the accompanying drawings, in which like references indicate similar elements and in which.

Other features of the present embodiments will be apparent from the accompanying drawings and from the detailed description that follow.

DETAIL DESCRIPTION

A system and method for migrating at least one switch in a storage network (SN) is described. In the following detailed description of various embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims. The methods described herein may be embodied as logic instructions on a computer-readable medium. When executed on a processor, the logic instructions cause a general purpose computing device to be programmed as a special-purpose machine that implements the described methods. The processor, when configured by the logic instructions to execute the methods recited herein, constitutes structure for performing the described methods.

Figure 1:
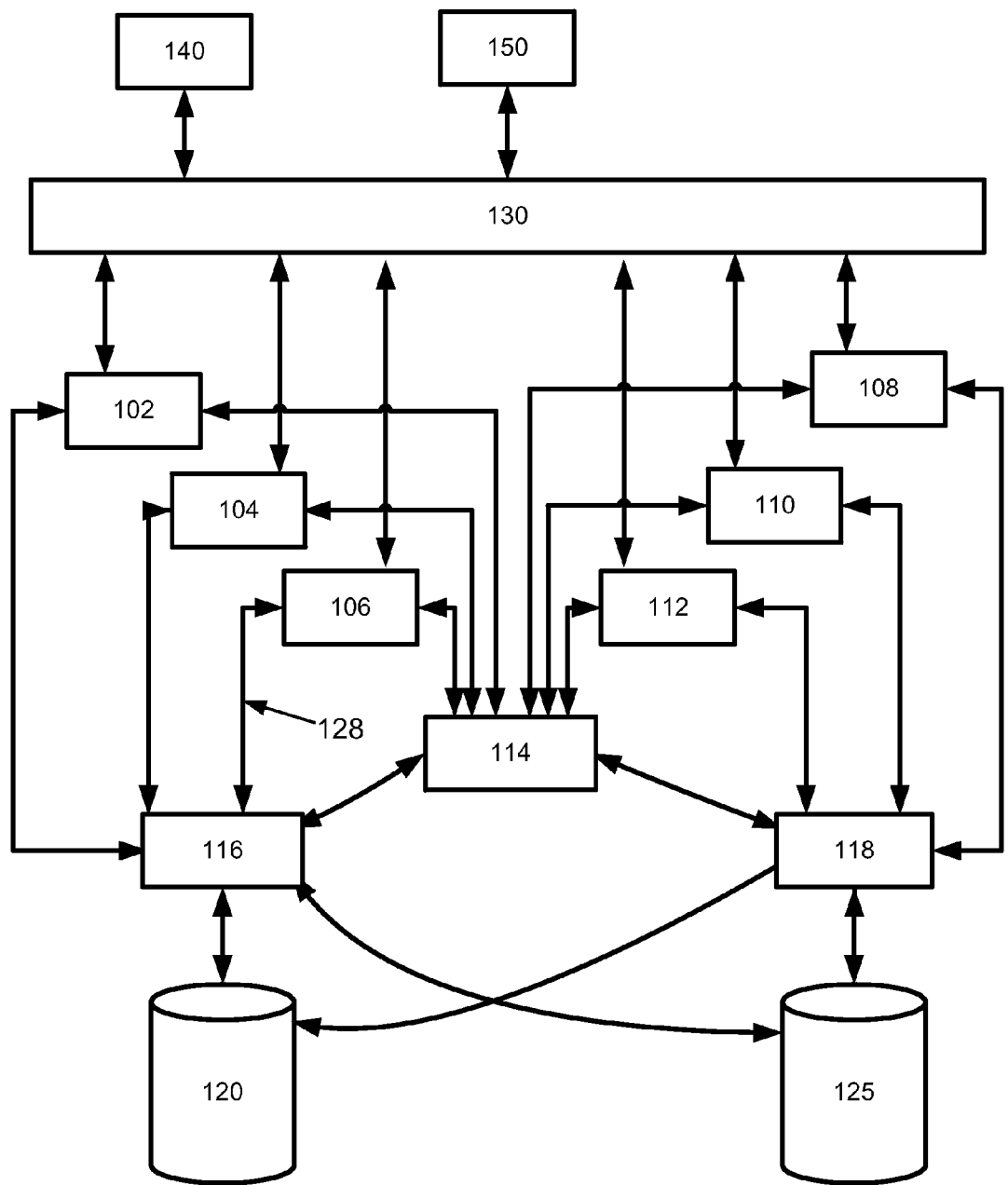
FIG. 1 shows a schematic diagram of an exemplary storage area network with physical links.

FIG. 1 illustrates a schematic diagram of an exemplary storage network with physical links. The storage network may comprise servers 102, 104, 106, 108, 110, 112, switches 114, 116, 118 and data storage 120, 125. Severs 102, 104, 106, 108, 110, 112 and data storage 120, 125 are connected through a network 128. The network 128 may be any variety of network type, such as ethernet, fibre channel (FC), or the like. The users 150 and administrators 140 may be connected to the SAN through a network 130. There may be more than one user and one administrator connected to the SAN. The SAN may also comprise controllers, cooling agents and several others components not depicted in FIG. 1.

Servers 102, 104, 106, 108, 110, 112 may be a computer system to run a specific application in the SAN. Servers 102, 104, 106, 108, 110, 112 may be a computer program that provides services to other computer programs or their users, in the same or other computer. A SAN in medium and large enterprises may contain hundreds to thousands of connected servers.

The switches 114, 116, 118 are compatible with the fibre channel protocol. The switch allows the creation of a fibre channel fabric, a network of fibre channel devices which may allow many-to-many communication, device name lookup, security and redundancy. The switch may also implement zoning, a mechanism that disables unwanted traffic between certain fabric nodes. The SAN in medium and large enterprises may contain tens to hundreds of switches.

The data storage 120, 125 may be, for example, disk drives, such as RAID devices, tape storage devices, or other types of mass-storage devices. The data storage 120, 125 can be further partitioned into data storage regions with a unique logical unit number (LUN). The existing SANs in medium and large enterprises can contain tens to hundreds of data storage with storage capacity well above terabytes.

Figure 2:
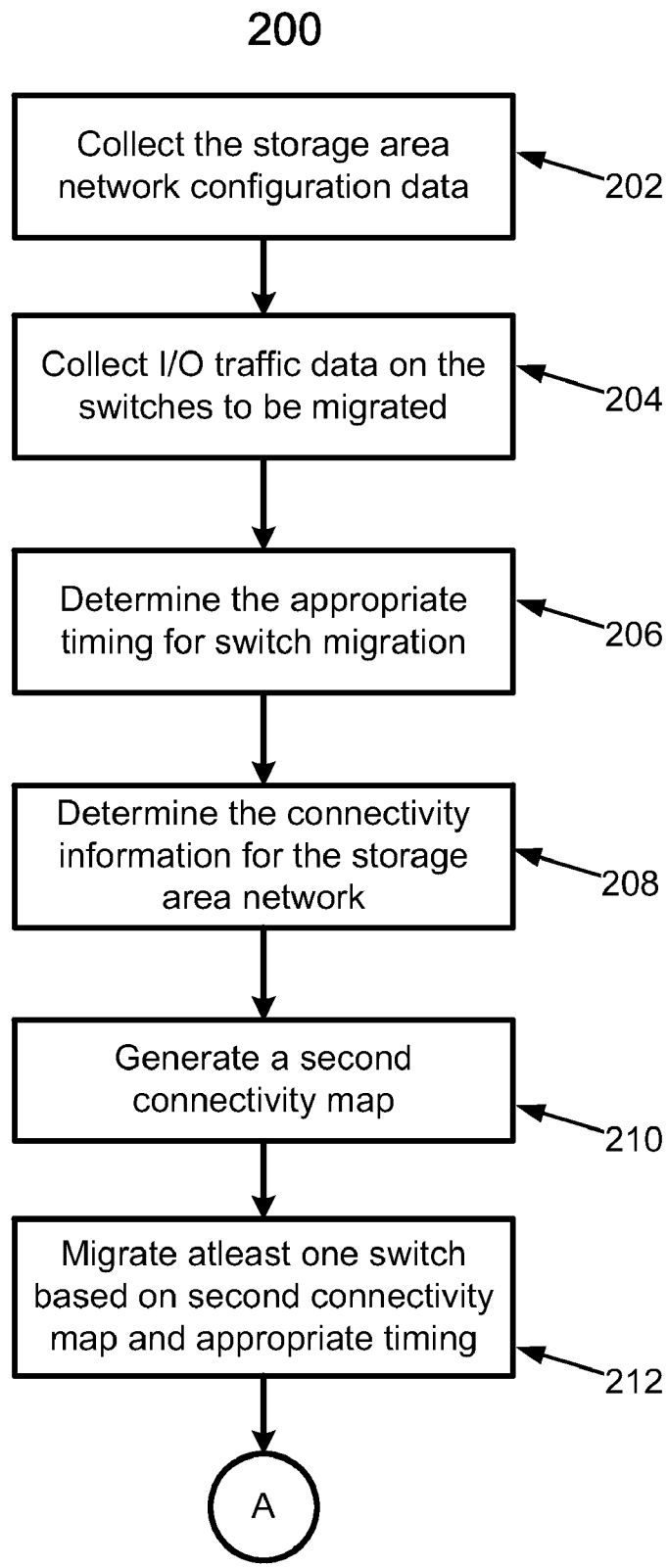
FIG. 2 is a flow diagram illustrating steps involved in migration of at least one switch in a storage area network.

FIG. 2 is a flow chart illustrating steps involved in a method 200 for migration of at least one switch in a storage area network. The migration of the switch may refer to adding a new switch in place of the existing switch in a storage area network. The migration may also include routing the I/O traffic from an existing switch to a different/new switch in the SAN. The migration of a switch in the storage area network can be initiated by a user or a system administrator. The migration of the switch may be initiated for upgrading the SAN components. The migration may be initiated for server consolidation, server virtualization, fabric modifications such as topology changes, fabric maintenance, making the SAN as disaster proof, consolidating multiple data centers at various geographical sites, for instance.

At step 202 of FIG. 2, the method for switch migration in a storage area network starts with collecting the SAN configuration data. The SAN configuration data may include the connectivity information of the SAN components. As an example the connectivity information may comprise the access path for an application running on the server to a data storage assigned for the application. The method 200 at step 204 can also collect the I/O traffic data on the switch to be migrated. The I/O traffic data may comprise information such as a measure of the rate of the I/O traffic to/from on the switch to be migrated in MBPS and/or IOPS. The I/O traffic data is collected using a standard data collection protocol of the SAN. The standard data collection protocol may also collect the information regarding critical device events in the SAN. The I/O traffic data is recorded and stored in a database along with the date and time with which it is associated. For example, each database entry may be provided with a date and/or time stamp indicating the date and/or time at which the I/O traffic data was measured. Step 204 may be repeated over time to obtain database of I/O traffic data with respect to time, with the regularity of repetition being adapted or controlled depending on accuracy considerations, for example.

At step 206, an appropriate timing for switch migration is determined. The appropriate timing for a switch migration is the time when the I/O traffic on the switch to be migrated is below a predetermined level. The predetermined level for I/O traffic may be determined by the user or the system administrator. According to an example embodiment the appropriate timing is determined by analysing the I/O traffic to identify patterns in the I/O traffic of the switch to be migrated and forecasting future I/O workload of the switch based on one or more identified patterns in the I/O traffic.

According to an example embodiment, for determining the appropriate timing, the I/O traffic data stored in the real time database is analyzed. The step of determining a recommended time period may comprise using trend analysis and forecasting techniques, such as regression analysis, across one or more time periods to forecast the occurrence of a recommended time period in the future. It is made sure that the recommended time period is a recommendation of a time block where forecasted I/O load is within the predetermined limit and the length of the time block is more than the time required for removing and adding new switch. The administrator may determine that the migration may not be initiated on the occurrence of a critical event.

At step 208 of FIG. 2, a first connectivity map for the SAN is determined. The first connectivity map may include the data access path from an application running on the server to a data storage assigned for the application. The first connectivity map may also include both physical and logical access paths for an application on a server to the data storage. The first connectivity map may be generated in a graphical user interface or graphical form for the administrator. The first connectivity map may be stored in a memory in form of a real time data base.

In a SAN for a data flow to be enabled end-to-end from a particular given application to a particular given data storage unit at least one physical path should exist between the corresponding server and the corresponding data storage. The logical access path refers to a logical channel between a given application running on a server and a given storage unit along which data can flow. A logical access path is a sequence of components starting with a specific application on a specific server via an host bus adapter, and a sequence of a number (one or more) of switches and physical links, leading to storage controller and a storage device containing a specific storage unit, such that the logical state (configuration state) of each component along the way in that sequence (for example the HBA, the storage controller, and each of the switches is set such as to not disable data flow between that specific application and that specific storage unit along that specific sequence. A physical path is a distant link from a server to the data storage unit through one or more switches.

At step 210 of FIG. 2, a second connectivity map is generated based on the first connectivity map and the inputs from the administrator. The administrator inputs may comprise the list of switches to be migrated in the SAN for instance. The second connectivity map may be generated based on the new switches to be added in the SAN. The second connectivity map comprises the connection details for the new switches including the transferring of the configuration on the switch to be migrated. The second connectivity map may be presented in form of a graphical user interface to the administrator.

At step 212, the switch migration process is initiated based on the administrator prompt. According to an embodiment, a message is generated for the administrator to initiate the switch migration process when the I/O traffic on the switch to be migrated is below a predetermined level. The switch migration may be initialized automatically in the time period based on the administrator inputs.

Figure 3:
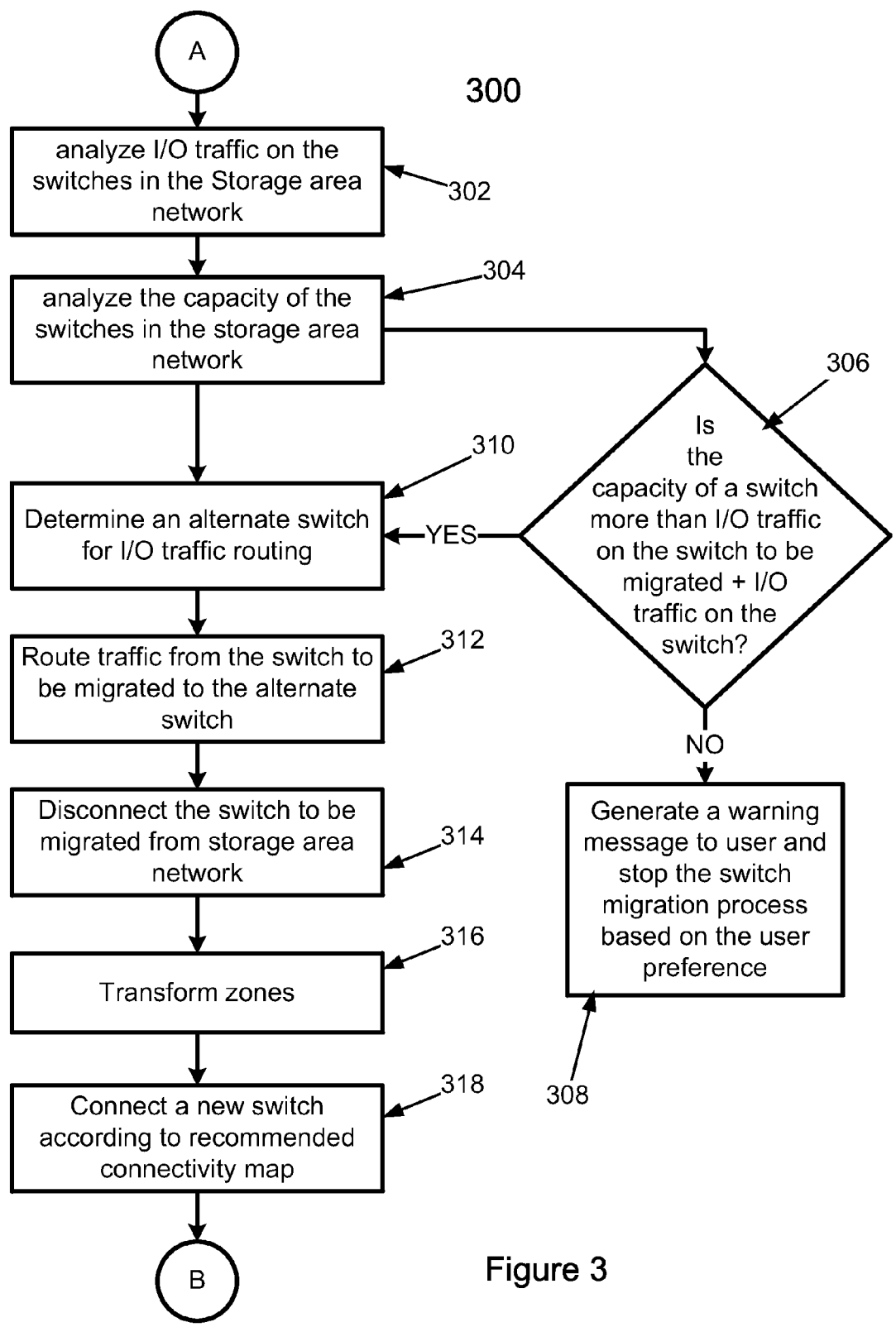
FIG. 3 is a flow diagram illustrating steps of an algorithm for adding at least one switch in a storage area network.

FIG. 3 illustrates a method 300 for adding a new switch in the storage area network in place of the switch to be migrated. In a switch migration process the switch to be migrated is disconnected from the SAN and a new switch is connected. At step 302, of FIG. 3, the method 300 may analyse the I/O traffic data on the switches in the network. The I/O traffic data on the switches is obtained by a standard data collecting protocol. According to an example embodiment the I/O traffic data may be collected for the switches connected to the same fabric as the switch to be migrated is connected. The method 300 may collect the I/O traffic data on the switches over a predetermined period of time.

At step 304 of FIG. 3, the method 300 may determine the capacity of the switches in the network. The capacity of the switches comprises determining the maximum amount of I/O traffic data that can be handled by a switch. The capacity of the switches can be obtained by a standard data collection tool. The capacity of the switches may also be obtained by the data sheet provided by the manufacturer of the switch.

At step 306 of FIG. 3, the method 300 may determine if the capacity of the redundant switches in the network is more than the I/O traffic data on the switch to be migrated and the I/O traffic data on the redundant switches. If the capacity of the redundant switches in the SAN is less than the I/O traffic on the redundant switches and the switch to be migrated a warning message for the system administrator is generated. The warning message comprises a possible degradation of the throughput if the administrator is to continue with the switch migration process. The warning message may advise the administrator against the switch migration, if the possible downgrade in the services is below a predetermined level.

At step 310, if the capacity of the redundant switches is more than the I/O traffic at the redundant switches and the switch to be migrated, the method 300 may identify at least one switch, on which the I/O traffic from the switch to be migrated may be routed. According to an embodiment, more than one switch for I/O traffic routing can be identified, which leads to the same logical unit number or data storage. At step 312, the I/O traffic from the switch to be migrated is routed to the above identified redundant switches. The I/O traffic from the may be routed by using an application running on the server. The information about the switches where I/O traffic is routed is stored in a memory in a real time database.

At step 314, a message is generated to the administrator 150 prompting him to disconnect the switch to be migrated. After receiving the prompt message at step 314, the switch to be migrated is disconnected from the storage area network. Another message is generated to the administrator 150 to connect the new switch in the SAN in place of the switch to be migrated. The administrator 150, after receiving the message prompt may add the new switch in the SAN and switch it on. The method 300 may transform the configurations from the switch to be migrated and apply to the newly added switch. The administrator 150 may connect the new switch in accordance to the second connectivity map and switch them on.

According to an example embodiment, at step 316 of FIG. 3, the method 300 may transform zones for the new switch using the second connectivity map. Zoning is the partitioning of a fibre channel fabric into smaller subsets to restrict interference, add security, and to simplify management. If a SAN contains several storage devices, each system connected to the SAN is not allowed to interact with all of them. The zones are sets of device ports between which data may flow via that switch. For example, each switch typically supports the definition of different type of zones. The zones are transformed based on the existing zones on the switch to be migrated, input from the administrator and the properties of the switch to be added. The transformed zones may be stored in a memory as real time database. The method 300 may also determine if the newly added switch have any existing zones also known as stale zones. If there are stale zones on the newly added switch, the method 300 may delete those zones and deploy the transformed zones. The method 300 may also install the transformed zones on the new switch.

Figure 4:
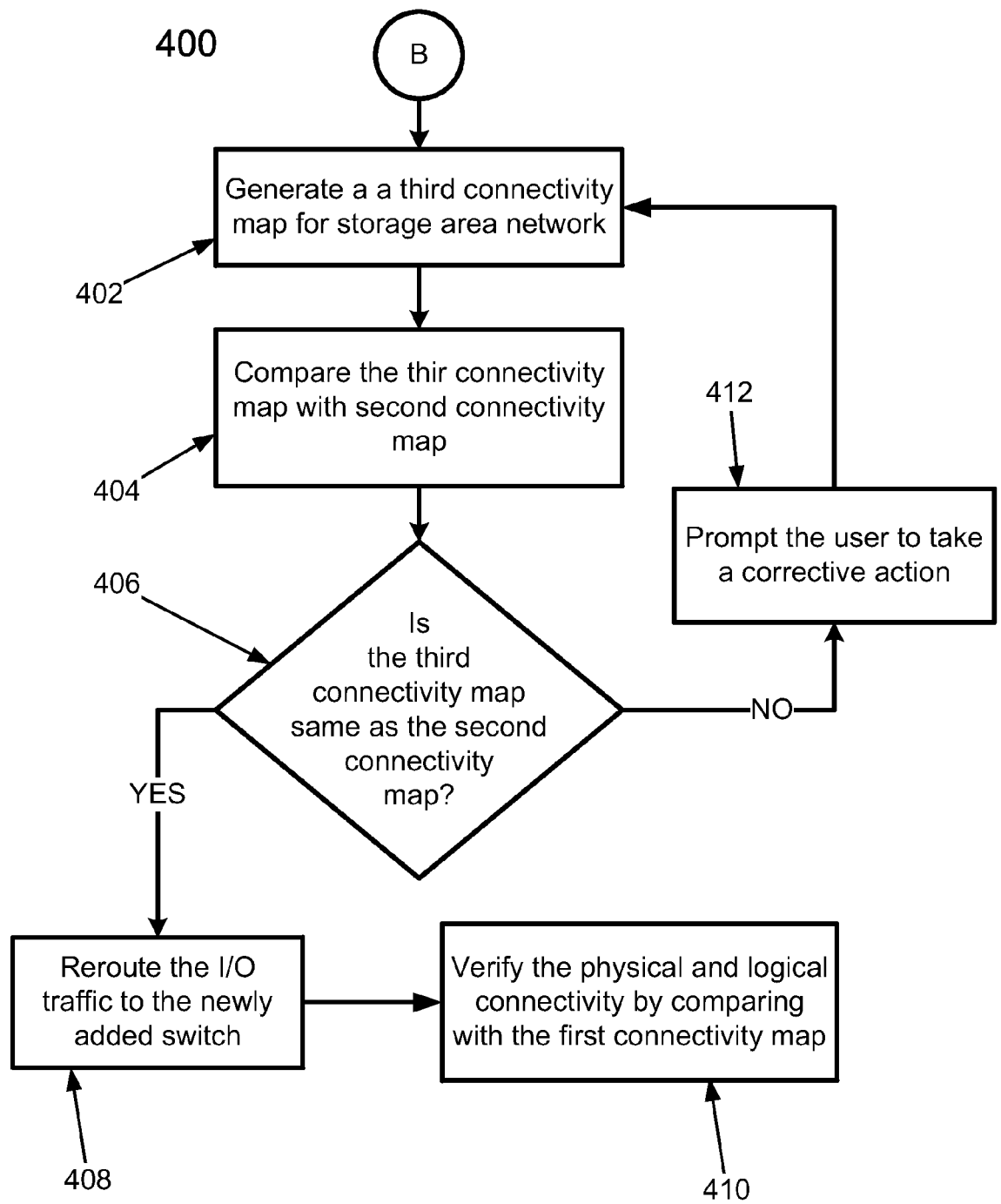
FIG. 4 is a flow diagram for validating the migration of switch in a storage area network.

FIG. 4 illustrates a method 400 for validating the migration of at least one switch in the SAN. At step 402, after connecting new switch, a third connectivity map is generated for the SAN. The method 400, at step 404 may compare the third connectivity map with the second connectivity map. The method 400, at step 406 may determine whether the third connectivity map is same as the second connectivity map. The administrator 150 may allow certain variations in the third connectivity map. The allowed variations from the administrator 150 and the third connectivity map are stored in the memory as real time database.

At step 412, if the third connectivity map is not same as the second connectivity map, a message to the administrator 150 is generated for him to take a corrective action. The message may comprise a recommended corrective action. The recommended corrective action may be sent to the administrator in form of a graphical user interface. The step 412 is repeated till the connections for the new switch are same as the second connectivity map with the maximum allowed variations. At step 408, if the third connectivity map is same as the second connectivity map with maximum allowed variations, the I/O traffic from the redundant switches is rerouted to the newly added switch.

According to an example embodiment, the method 400 at step 410, may also verify the third connectivity map with the first connectivity map. The method 400, by comparing the first connectivity map with the third connectivity map may verify the SAN connectivity from the host bus adaptor to the data storage. The method 400 may provide the administrator 150 with an option to rollback to the previous step. The rollback to the previous step may be done by undoing the changes done in the current step.

Figure 5:
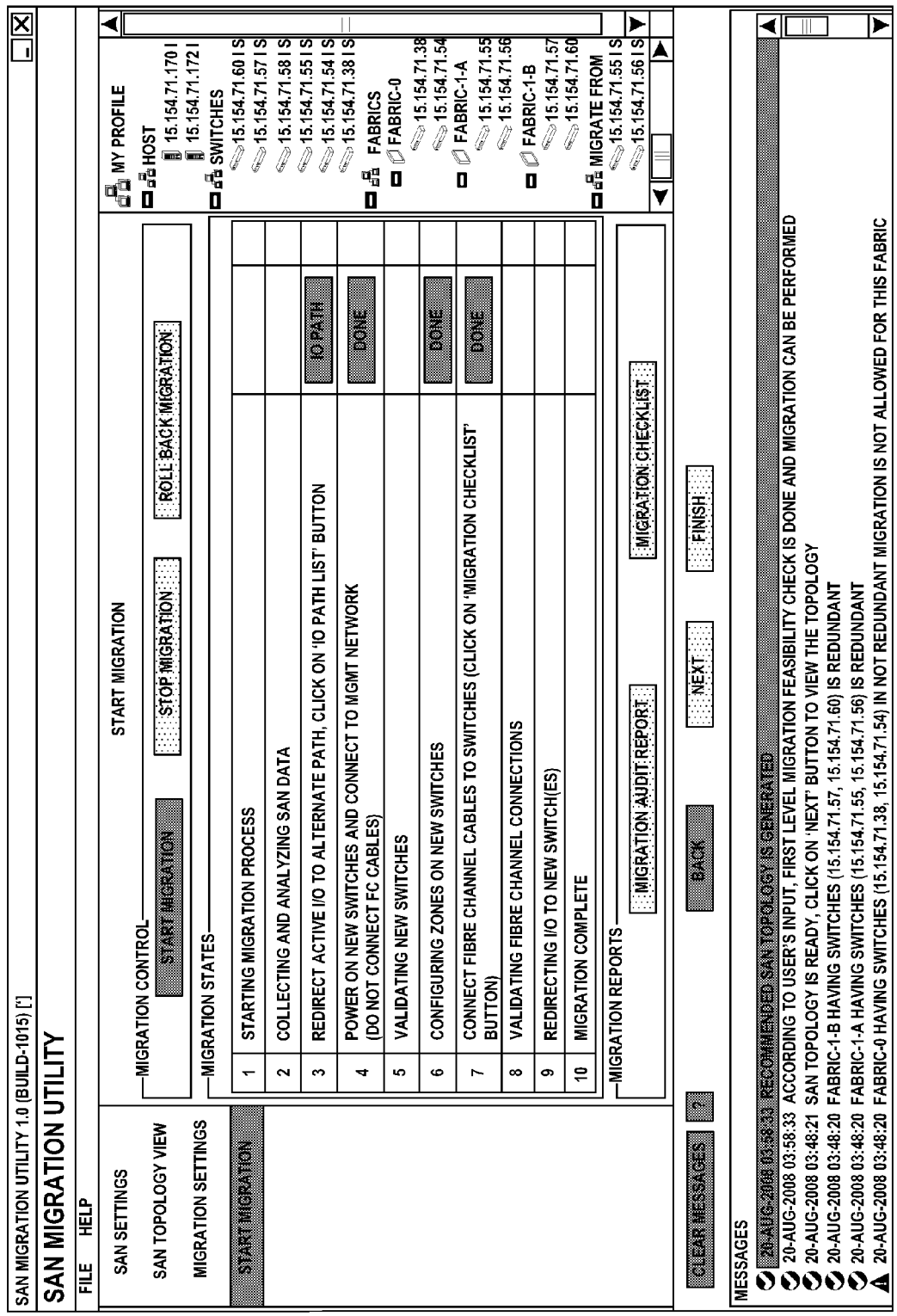
FIG. 5 is a screenshot of the graphical user interface of a method for migrating at least one switch in a storage area network.

FIG. 5 is a screenshot of the graphical user interface for a method for migrating at least one switch in a storage area network. The method for migrating at least one switch in the storage area network may maintain business continuity for applications which are using the path of the switch being migrated. The method may provide a recommendation to the user about when to migrate one or more switches in the SAN by monitoring the I/O traffic on the switch and the capacity of the switch. The method may also provide the administrator a real time feedback on the I/O traffic distribution on during migration thereby facilitating the administrator to complete the migration process within a specified timeframe with relevant precautionary messages on the I/O traffic conditions. It will be understood that embodiments enable a switch in a SAN to be migrated whilst minimizing or avoiding disruptions in I/O processing. The above described method is not limited to the migration of switches and may be employed in migration of other components, fabric, and host bus adaptor for instance, in a storage area network.

Figure 6:
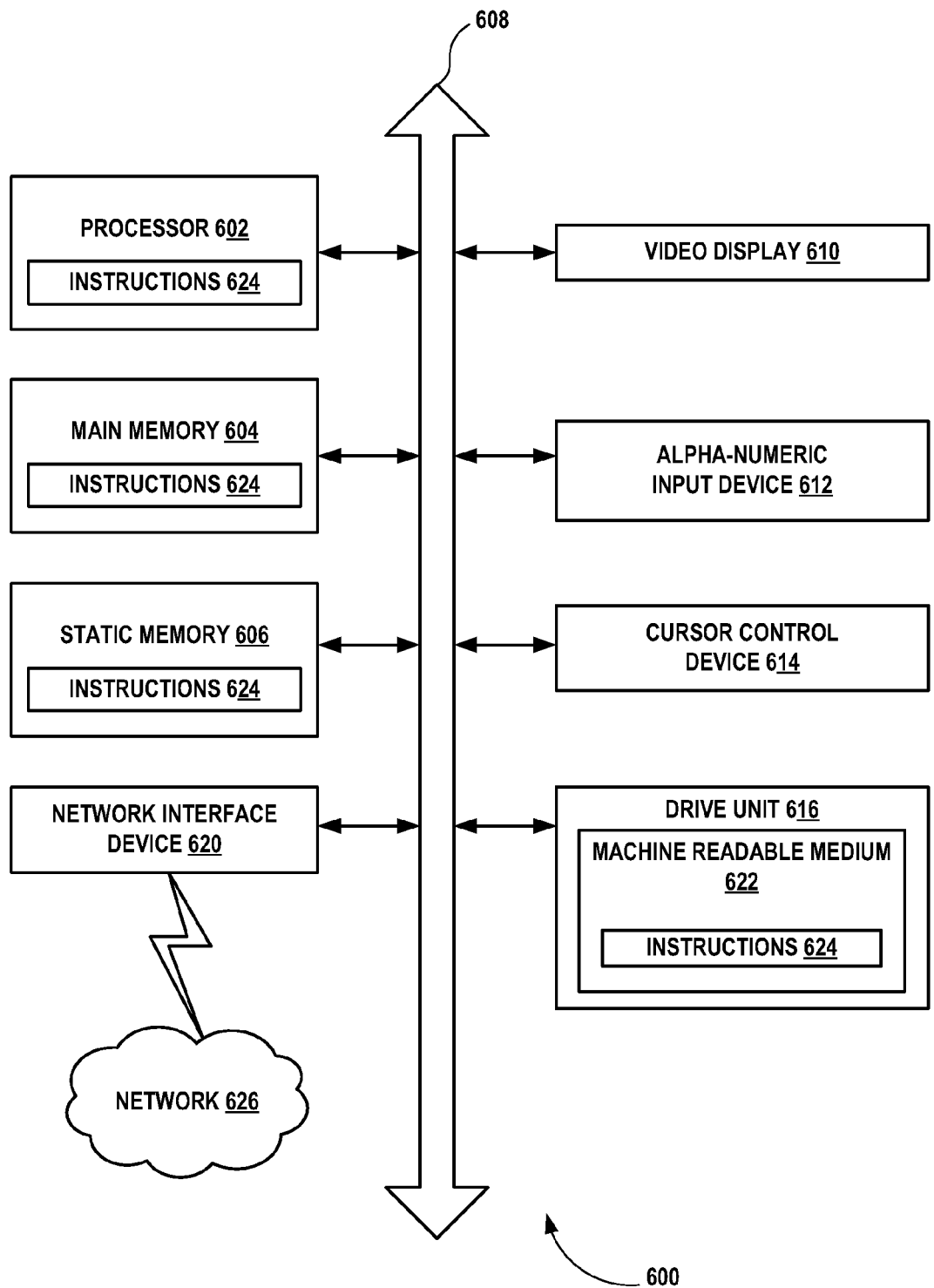
FIG. 6 is a diagrammatic system view of a data processing system in which any of the embodiments disclosed herein may be performed, according to one embodiment.

FIG. 6 is a diagrammatic system view 600 of a data processing system in which any of the embodiments disclosed herein may be performed, according to one embodiment. Particularly, the diagrammatic system view of FIG. 6 illustrates a processor 602, a main memory 604, a static memory 606, a bus 608, a video display 610, an alpha-numeric input device 612, a cursor control device 614, a drive unit 616, a signal generation device 618, a network interface device 620, a machine readable medium 622, instructions 624 and a network 626.

The diagrammatic system view 600 may indicate a personal computer and/or a data processing system in which one or more operations disclosed herein are performed. The processor 602 may be a microprocessor, a state machine, an application specific integrated circuit, a field programmable gate array, etc. The main memory 604 may be a dynamic random access memory and/or a primary memory of a computer system. The static memory 606 may be a hard drive, a flash drive, and/or other memory information associated with the data processing system.

The bus 608 may be an interconnection between various circuits and/or structures of the data processing system. The video display 610 may provide graphical representation of information on the data processing system. The alpha-numeric input device 612 may be a keypad, keyboard and/or any other input device of text (e.g., a special device to aid the physically handicapped). The cursor control device 614 may be a pointing device such as a mouse. The drive unit 616 may be a hard drive, a storage system, and/or other longer term storage subsystem.

The network interface device 620 may perform interface functions (e.g., code conversion, protocol conversion, and/or buffering) required for communications to and from the network 626 between a number of independent devices (e.g., of varying protocols). The machine readable medium 622 may provide instructions on which any of the methods disclosed herein may be performed. The instructions 624 may provide source code and/or data code to the processor 602 to enable any one or more operations disclosed herein.

It will be appreciated that the various embodiments discussed herein may not be the same embodiment, and may be grouped into various other embodiments not explicitly disclosed herein. In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

Although the present embodiments have been described with reference to specific embodiments, it will be evident that various modifications and changes may be made to these embodiments without departing from the broader spirit and scope of the various embodiments. For example, the various devices, described herein may be enabled and operated using hardware circuitry (e.g., CMOS based logic circuitry), firmware, software and/or any combination of hardware, firmware, and/or software (e.g., embodied in a machine readable medium). For example, the various electrical structure and methods may be embodied using transistors, logic gates, and electrical circuits (e.g., application specific integrated circuits (ASIC)).

The invention claimed is:

1. A method of migrating at least one selected switch in a storage area network, the method comprising:
   analyzing the I/O traffic to identify patterns in the I/O traffic of the switch; and
   forecasting future I/O traffic of the switch based on one or more identified patterns in the I/O traffic;
   determining appropriate timing for migration based on the identified patterns and administrator inputs;
   processing the storage area network configuration data to identify the storage network physical and logical access paths to the switch to create a first connectivity map;
   generating a second connectivity map based on the first connectivity map and administrator inputs;
   migrating the switch based on the second connectivity map and the appropriate timing, comprising:
      determining I/O traffic on the switch to be migrated and the redundant switches in the storage area network;
      determining the capacity of the redundant switches and determining at least one alternate switch for I/O traffic routing;
      routing I/O traffic from the switch to be migrated to the alternate switch;
      removing the switch to be migrated from the storage area network; and
      connecting the new switch in the storage area network based on the second connectivity map.

2. The method of claim 1 further comprising:
   if the I/O traffic on the switch to be migrated is more than the capacity of the alternate switch, generating a warning message for the user and not initiating the routing of the I/O traffic to the alternate switch.

3. The method of claim 1 further comprising a mechanism to rollback to a previous step by undoing the changes done in the current steps.

4. The method of claim 1 further comprising rerouting the I/O traffic from the alternate switch to the new switch.

5. The method of claim 1 further comprising:
   transforming zones on the switch to be migrated based on second connectivity map; and
   deploying the transformed zones to the new switch.

6. The method of claim 5, further comprising detecting and deleting stale zones on the new switch.

7. The method of claim 1 further comprising:
   generating a third connectivity map of the storage area network after connecting new switch;
   comparing the third connectivity map with the second connectivity map; and
   prompting a user to take a corrective action if the third connectivity map deviates from the second connectivity map with predetermined variations.

8. The method of claim 7 further comprising verifying the storage area network connectivity by comparing the first connectivity map with the third connectivity map.

9. The method of claim 1 wherein the migration is online migration.

10. The method of claim 1 wherein optimal time for addition of the new switch is the time when the I/O traffic on the switch to be migrated is below a predetermined level.

11. The method of claim 1 wherein the second connectivity map includes steps to be followed by user during the switch migration process.

12. The method of claim 1 further comprising rerouting the I/O traffic from the alternate switch to the new switch.

13. A system for migrating at least one selected switch in a storage area network comprising:
   a I/O traffic monitoring unit adapted to monitor the I/O traffic of the switch to obtain information regarding I/O traffic of the switch;
   data storage means adapted to store configuration information of the storage area network and the I/O traffic information; and
   a processor adapted to
   analyze the I/O traffic to identify patterns in the I/O traffic of the switch:
   forecast future I/O traffic of the switch based on one or more identified patterns in the I/O traffic;
   determine appropriate timing for migration based on the identified patterns and administrator inputs;
   process the configuration information to identify the storage area network physical and logical access paths by creating a first connectivity map;
   generate a second connectivity map based on the first connectivity map and a new switch information; and
   migrate the switch based on the second connectivity map and the appropriate timing, wherein the processor is further adapted to:
      determine I/O traffic on the switch to be migrated and the redundant switches in the storage area network;
      determine the capacity of the redundant switches and determine at least one alternate switch for I/O traffic routing;
      route I/O traffic from the switch to be migrated to the alternate switch;
      removing the switch to be migrated from the storage area network; and
      connecting the new switch in the storage area network based on the second connectivity map.

14. The system of claim 13, wherein the processor is further adapted to: transform zones on the switch to be migrated based on second connectivity map; and deploy the transformed zones to the new switch.

15. The system of claim 13, wherein the processor is further adapted to:

generate a third connectivity map;
compare the third connectivity map with the second connectivity map; and
prompt a user to take a corrective action if the third connectivity map deviates from the second connectivity map with predetermined variations.

16. A computer program product for migrating at least one switch in a storage area network comprising a computer readable medium, the computer program product comprising a non-transitory storage medium readable by a processing circuit and storing instruction for execution by a processing circuit for performing a method comprising:
analyzing the I/O traffic to identify patterns in the I/O traffic on the switch;
forecasting future I/O traffic of the switch based on one or more identified patterns in the I/O traffic;
determining appropriate timing for migration based on the identified patterns and administrator inputs;
processing the storage area network configuration data to identify the storage network physical and logical access paths to the switch to create a first connectivity map;
generating a second connectivity map based on the first connectivity map and administrator inputs; and
migrating the switch based on the second connectivity map and the appropriate timing, comprising:
analyzing I/O traffic on the switch to be migrated and the redundant switches in the storage area network;
analyzing the capacity of the redundant switch and determining alternate switches for I/O traffic routing;
routing I/O traffic from the switch to be migrated to the alternate switch;
removing the switch from the storage area network; and
connecting the new switch in the storage area network based on the second connectivity map.

17. The computer program product of claim 16 further comprising:
generating a third connectivity map;
comparing the third connectivity map with the second connectivity map; and
prompting a user to take a corrective action if the third connectivity map deviates from the second connectivity map with predetermined variations.

18. The computer program product of claim 16 further comprising:
transforming zones on the switch to be migrated based on the second connectivity map; and
deploying the transformed zones to the new switch.

* * * * *

UNITED STATES PATENT AND TRADEMARK OFFICE
CERTIFICATE OF CORRECTION

| | | |
|---|---|---|
| PATENT NO. | : 8,054,763 B2 | Page 1 of 1 |
| APPLICATION NO. | : 12/466395 | |
| DATED | : November 8, 2011 | |
| INVENTOR(S) | : Vivek Mehrotra et al. | |

It is certified that error appears in the above-identified patent and that said Letters Patent is hereby corrected as shown below:

In column 8, line 38, in Claim 13, delete "switch:" and insert -- switch; --, therefor.

Signed and Sealed this
Thirty-first Day of July, 2012

David J. Kappos
*Director of the United States Patent and Trademark Office*